United States Patent
Jacobsen et al.

(10) Patent No.: US 8,411,774 B2
(45) Date of Patent: *Apr. 2, 2013

(54) METHOD AND APPARATUS TO SUPPORT SCALABILITY IN A MULTICARRIER NETWORK

(75) Inventors: Eric A. Jacobsen, Scottsdale, AZ (US); Jeff Foerster, Portland, OR (US); Dan Dahle, Wilsonville, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,330

(22) Filed: Sep. 12, 2011

(65) Prior Publication Data

US 2012/0002738 A1 Jan. 5, 2012

Related U.S. Application Data

(63) Continuation of application No. 11/418,609, filed on May 5, 2006, now Pat. No. 8,023,574.

(51) Int. Cl.
*H04L 27/28* (2006.01)

(52) U.S. Cl. ........ 375/260; 375/259; 370/454; 370/480; 370/481; 455/130; 455/131

(58) Field of Classification Search .......... 375/260, 375/259; 370/464, 480, 481; 455/130, 131
See application file for complete search history.

(56) References Cited

U.S. PATENT DOCUMENTS

| | | | |
|---|---|---|---|
| 6,052,600 A | 4/2000 | Fette et al. | |
| 6,347,071 B1 | 2/2002 | Cupo et al. | |
| 6,535,501 B1 | 3/2003 | Bohnke | |
| 6,545,997 B1 | 4/2003 | Bohnke et al. | |
| 7,751,307 B2 | 7/2010 | Muck et al. | |
| 8,023,574 B2 * | 9/2011 | Jacobsen et al. | 375/260 |
| 2002/0006167 A1 * | 1/2002 | McFarland | 375/260 |
| 2002/0167894 A1 | 11/2002 | Jacobsen | |
| 2003/0039205 A1 | 2/2003 | Chiodini | |
| 2004/0081073 A1 * | 4/2004 | Walton et al. | 370/204 |
| 2005/0169229 A1 * | 8/2005 | Cho et al. | 370/344 |

(Continued)

FOREIGN PATENT DOCUMENTS

| | | |
|---|---|---|
| CN | 101438554 A | 5/2009 |
| EP | 0869647 A2 | 10/1998 |

(Continued)

OTHER PUBLICATIONS

International Search Report and Written Opinion, PCT application No. PCT/US2007/06811, mailed on Oct. 10, 2007, 10 pages.
International Preliminary Report on Patentability, PCT Patent Application No. PCT/US2007/068111, mailed on Nov. 20, 2008, 6 pages.

(Continued)

*Primary Examiner* — Kenneth Lam
(74) *Attorney, Agent, or Firm* — Thorpe North & Western, LLP (57) ABSTRACT

A multicarrier communication device using orthogonal frequency division multiplexing (OFDM) symbols can vary the number of subcarriers being used on multicarrier communication within a network, based on a predetermined criterion and capability information. The capability information can include a data file, which indicates portions of an electromagnetic spectrum for which regulatory body licenses are currently obtained for a network cell. Alternatively, the capability information can include capability information about the wireless devices in communication with the multicarrier communication device, where the capability information for each wireless device includes device power limitations, device bandwidth width limitations, or which subcarriers a wireless device is capable of using.

19 Claims, 5 Drawing Sheets

U.S. PATENT DOCUMENTS

| | | | |
|---|---|---|---|
| 2005/0286408 A1* | 12/2005 | Jin et al. | 370/208 |
| 2006/0227888 A1 | 10/2006 | Khan | |
| 2006/0239241 A1* | 10/2006 | Eom et al. | 370/348 |
| 2007/0086396 A1 | 4/2007 | Alapuranen | |
| 2007/0091983 A1 | 4/2007 | Siriwongpairat et al. | |
| 2007/0195690 A1 | 8/2007 | Bhushan | |
| 2007/0258525 A1 | 11/2007 | Jacobsen et al. | |
| 2008/0039107 A1* | 2/2008 | Ma et al. | 455/450 |

FOREIGN PATENT DOCUMENTS

| | | |
|---|---|---|
| EP | 2020133 A1 | 2/2009 |
| GB | 2366494 A | 3/2002 |
| WO | 2007131090 A1 | 11/2007 |

OTHER PUBLICATIONS

Office Action for CN Patent Application No. 200780015981.5, mailed on Feb. 1, 2011, 28 pages.

Extended European Search Report received for European Application No. 07761798.3 mailed on Apr. 20, 2012, 6 pages.

Office Action received for Chinese Patent Application No. 200780015981.5, mailed on Mar. 8, 2012, 9 pages of Office Action, including 5 pages of English translation.

Office Action received for Chinese Patent Application No. 200780015981.5, mailed on Aug. 20, 2012, 8 pages of Office Action, including 5 pages of English translation.

* cited by examiner

METHOD AND APPARATUS TO SUPPORT SCALABILITY IN A MULTICARRIER NETWORK

CROSS REFERENCE TO RELATED APPLICATIONS

This application is a Continuation of U.S. patent application Ser. No. 11/418,609, filed May 5, 2006, entitled "METHOD AND APPARATUS TO SUPPORT SCALABILITY IN A MULTICARRIER NETWORK," which is herein incorporated by reference in its entirety.

BACKGROUND OF THE INVENTION

As the subscriber base of a communication network grows, a point may be reached where the network hardware is no longer capable of adequately servicing the many demands placed upon the network. As a result, communication quality within the network may suffer. There is a need for techniques that allow network hardware to adapt to changing service demand levels.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
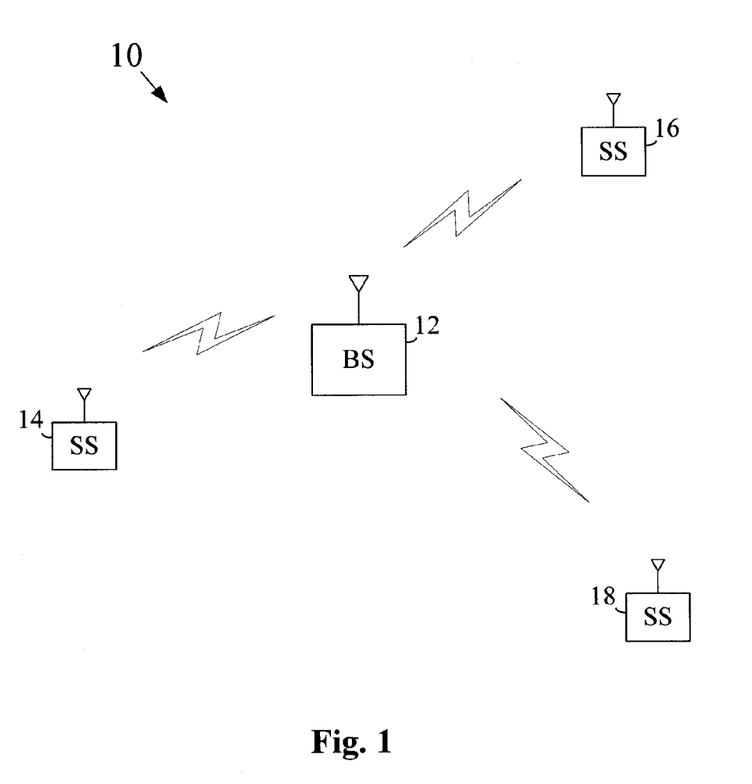
FIG. 1 is a block diagram illustrating a wireless network arrangement that may incorporate features of the present invention.

FIG. 1 is a block diagram illustrating a wireless network arrangement 10 that may incorporate features of the present invention. As shown, a wireless base station (BS) 12 is providing network access services for a plurality of wireless subscriber stations (SSs) 14, 16, 18 within a coverage region or cell thereof. Communication from the BS 12 to the individual SSs 14, 16, 18 may be referred to as "downlink" communication and communication from the SSs 14, 16, 18 to the BS 12 may be referred to as "uplink" communication. The BS 12 and the SSs 14, 16, 18 may utilize a form of multicarrier communication known as orthogonal frequency division multiplexing (OFDM) to communicate with one another. OFDM uses a plurality of orthogonal subcarriers to transfer information through a communication channel. Each subcarrier may be modulated with a different data symbol. All of the modulated subcarriers may be transmitted together as a single "OFDM symbol." OFDM symbols may be transmitted one after another through a wireless channel to achieve high data rate communication.

In a traditional OFDM approach, each OFDM symbol transmitted by a BS is intended for a single user (i.e., a single SS). That is, all of the data subcarriers of the OFDM symbol will, if used, carry information for a single user. Orthogonal frequency division multiple access (OFDMA) is an extension of OFDM that allows the subcarriers of an OFDM symbol to be allocated among a number of different users. Thus, when a BS transmits an OFDM symbol in an OFDMA-based network, some of the subcarriers within the symbol may be carrying data for a first user, some of the subcarriers may be carrying data for a second user, and so on. Similarly, when the BS receives an OFDM symbol in the OFDMA-based network, some of the subcarriers within the symbol may be carrying data from a first user, some of the subcarriers may be carrying data from a second user, and so on. A scheduler may be provided within the BS to determine when, and in which subcarriers, data will be transmitted from the BS to the individual SSs and when, and in which subcarriers, data will be transmitted from the individual SSs to the BS. This information may be communicated to the corresponding SSs in the form of Multiple Access Protocol (MAP) data transmitted by the BS.

In both traditional OFDM and OFDMA based networks, as more users are added to a particular BS cell, it becomes more difficult to provide quality services to all of the active SSs in the cell. In many cases, this can result in an inability to satisfy quality of service (QOS) commitments to users in the network. In one aspect of the present invention, techniques and structures are provided that support scalability within network equipment to allow the equipment to adapt to changing demand levels in the network.

Figure 2:
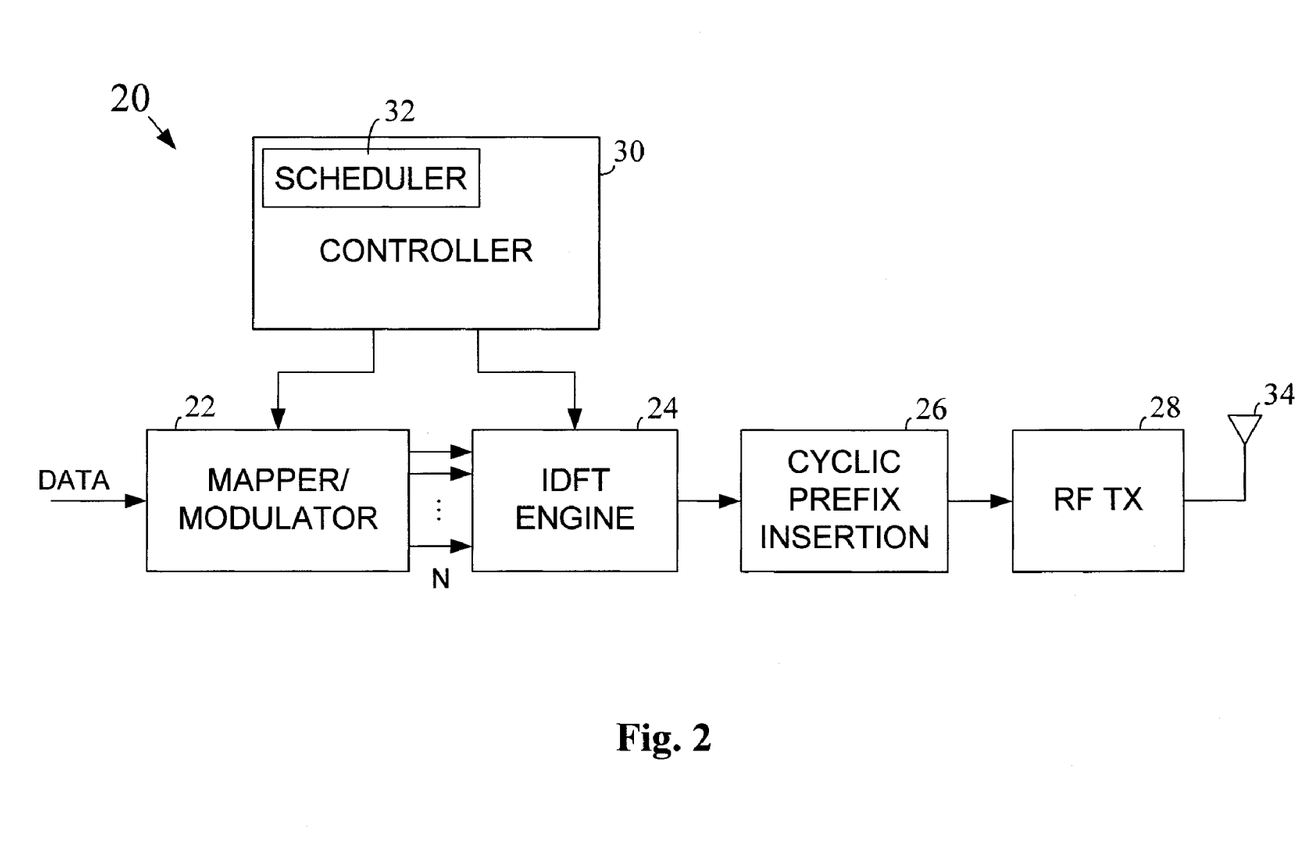
FIG. 2 is a block diagram illustrating an example transmitter chain in accordance with an embodiment of the present invention.

FIG. 2 is a block diagram illustrating an example transmitter chain 20 in accordance with an embodiment of the present invention. The transmitter chain 20 may be used within, for example, the BS 12 of FIG. 1 or in other base stations or access points for use in wireless systems. As illustrated, the transmitter chain 20 may include one or more of: a mapper/modulator 22, an inverse discrete Fourier transform (IDFT) engine 24, cyclic prefix insertion logic 26, a radio frequency (RF) transmitter 28, and a controller 30 that includes scheduler logic 32. The mapper/modulator 22 receives data at an input and maps the data into the data symbols that will be transmitted via each of the subcarriers of the OFDM symbol. After the data has been mapped, the mapped symbols may be used to modulate the corresponding subcarriers. In some embodiments, the same modulation scheme may be used to modulate all of the subcarriers, while in other embodiments, different modulation schemes may be used for different subcarriers (based on, for example, current channel conditions associated with the individual subcarriers, etc.). Some of the subcarriers in the OFDM symbols may be used as pilot tones that carry known data samples. These pilot tones may be used by a receiver for, for example, continuous channel estimation. Other subcarriers in the OFDM symbols may be used as data tones to carry user data between communication devices.

The IDFT engine 24 receives the data modulated subcarriers from the modulator/mapper 22 and performs an inverse discrete Fourier transform on the subcarriers to convert the signals from a frequency domain representation to a time domain representation. Any form of inverse discrete Fourier transform may be used including, for example, inverse fast Fourier transforms (IFFTs) and others. The cyclic prefix insertion logic 26 may then add a cyclic prefix to the time domain signal output by the IDFT engine 24. The cyclic prefix is a prefix that is added to the time domain symbol to combat multi-path impairment and intersymbol interference in the channel. In a typical approach, a copy of the last portion of the data symbol is appended to the front of the symbol to form the cyclic prefix. The size of the cyclic prefix will dictate the maximum delay spread tolerance of the channel in a multipath environment. The output of the cyclic prefix insertion logic 26 is the OFDM symbol that will be transmitted into the channel.

The RF transmitter 28 receives the OFDM symbol output by the cyclic prefix insertion logic 26 and converts it to an analog RF signal for transmission. The RF transmitter 28 may include a digital to analog converter (DAC) at an input thereof to first convert the OFDM symbol to an analog format. The analog signal may then be upconverted to RF, filtered, and amplified. The amplified signal may then be delivered to one or more antennas 34 for transmission into the wireless channel. Any type of antenna(s) may be used including, for example, a dipole, a patch, a helical antenna, an antenna array, and/or others.

The controller 30 may control some or all of the operational characteristics of the transmitter chain 20. The controller functionality may be implemented within, for example, one or more digital processing devices within the corresponding communication device. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used. As described previously, the controller 30 may include scheduler logic 32. Among other things, the scheduler logic 32 may be operative for developing subcarrier/time allocations during which communications will be allowed to occur between a BS and corresponding SSs. For example, the scheduler logic 32 may develop "frame structures" for a corresponding cell that describe which subcarriers will be used to carry information for which users at which times. This may be done for both the uplink and the downlink directions. These frame structures may be continuously generated by the scheduler logic 32 during device operation.

Figure 3:
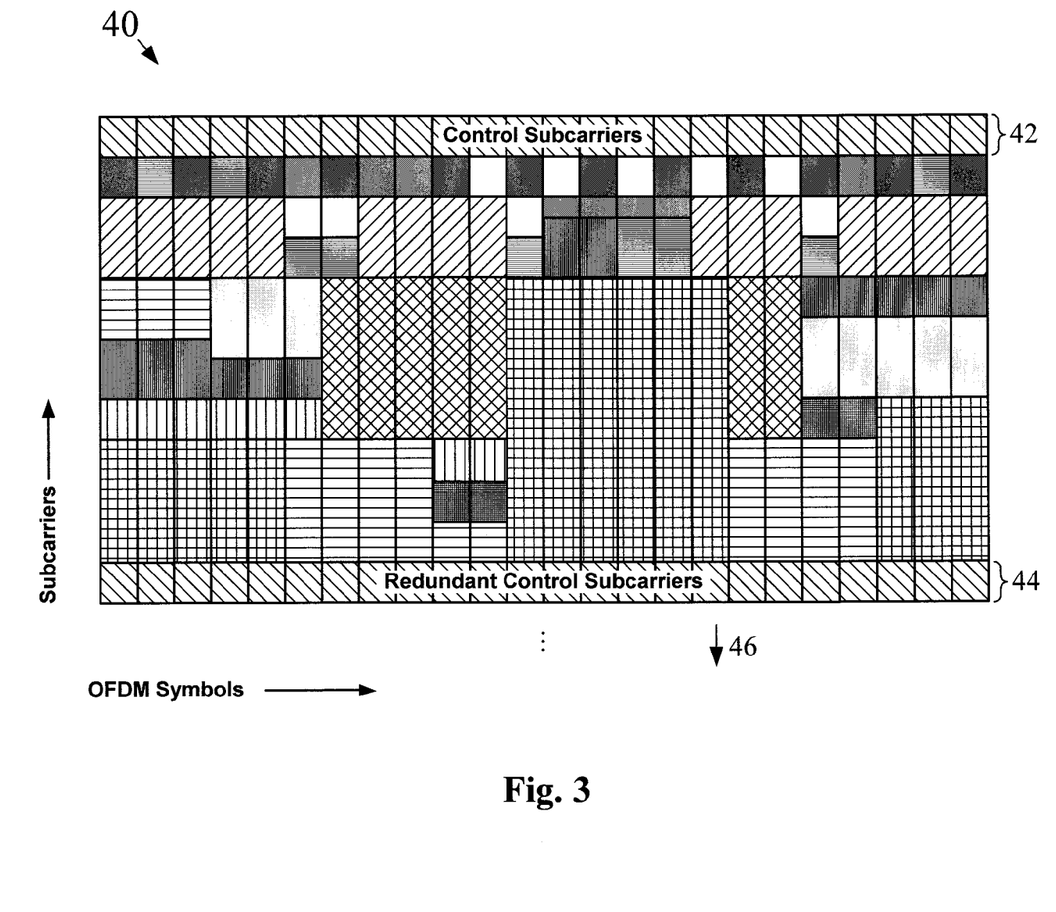
FIG. 3 is a diagram illustrating an example frame structure that may be developed by scheduler logic in accordance with an embodiment of the present invention.

FIG. 3 is a timing diagram illustrating an example frame structure 40 that may be developed by the scheduler logic 32 at a particular point in time. The vertical axis of the frame structure 40 represents the subcarriers of the corresponding frame and the horizontal axis represents the OFDM symbols. As shown, the OFDM symbols occur one after another within the frame structure 40. The various shaded regions of the frame structure 40 represent the subcarriers within specific OFDM symbols that have been assigned to corresponding users in the cell by the scheduler logic. Each shading pattern corresponds to a particular user. The uplink and downlink traffic may be separated into uplink and downlink subframes or a more flexible approach may be used. In one alternative approach, for example, the uplink and downlink status may be permitted to change from OFDM symbol to OFDM symbol. Other techniques may alternatively be used.

As illustrated in FIG. 3, one or more control subcarriers 42 may be provided within the frame structure 40 to carry MAP data that describes the makeup of the frame structure 40 (and possibly other control information). Individual SSs in the cell can read these control subcarriers 42 to determine which subcarriers within which OFDM symbols will include downlink data for them and which subcarriers within which OFDM symbols they can use to transmit uplink data to the BS. As shown in FIG. 3, one or more redundant control subcarriers 44 may also be used to provide redundancy in case the primary control subcarriers 42 become unreadable (due to, for example, multipath fading, etc.). As described above, in the embodiment of FIG. 3, the MAP data is transmitted within one or more control subcarriers 42. In other embodiments, the MAP data for an entire frame may be located within one or more control OFDM symbols near the beginning of the frame.

Referring back to FIG. 2, in at least one embodiment of the present invention, the controller 30 is capable of varying the number of subcarriers (N) that will be present in the OFDM symbols of the cell, based on some criterion. In this manner, scalability may be supported within the network. The word scalability refers to the ability of a component, device, or system to expand to meet future needs. In one approach, the scheduler logic 32 may determine the number of subcarriers (N) that will be used at a particular time based upon, for example, the current traffic load within the corresponding cell. Other criteria may alternatively be used. When the scheduler logic 32 determines a new value for N, the controller 30 may then cause the IDFT engine 24 to be reconfigured in accordance with the new value of N. Thus, if N is increased, the size of the IDFT will also be increased and if N is decreased, the size of the IDFT will be decreased. In addition to causing the IDFT engine 24 to be reconfigured, the controller 30 may also cause the mapper/modulator 22 to be reconfigured based on the new value of N. For example, the mapping function may now require mappings to a different number of subcarriers than before. After the scheduler logic 32 determines a new value of N, the new value may be communicated to the SSs within the cell as control information within a frame (e.g., in control subcarriers 42 in FIG. 3, etc.). The SSs may then reconfigure their circuitry to the new number of subcarriers, if needed.

The IDFT engine 24 may be reconfigured in a number of different ways. In a software based approach, for example, the IDFT size may be modified by loading a different algorithm/program into the IDFT engine 24 when the value of N changes. In a hardware based approach, different IDFT circuits may be provided having different IDFT lengths and switches may be used to switch between the different devices. Alternatively, switches may be used to concatenate different IDFT circuits to form a larger IDFT. Other techniques may alternatively be used.

Figure 4:
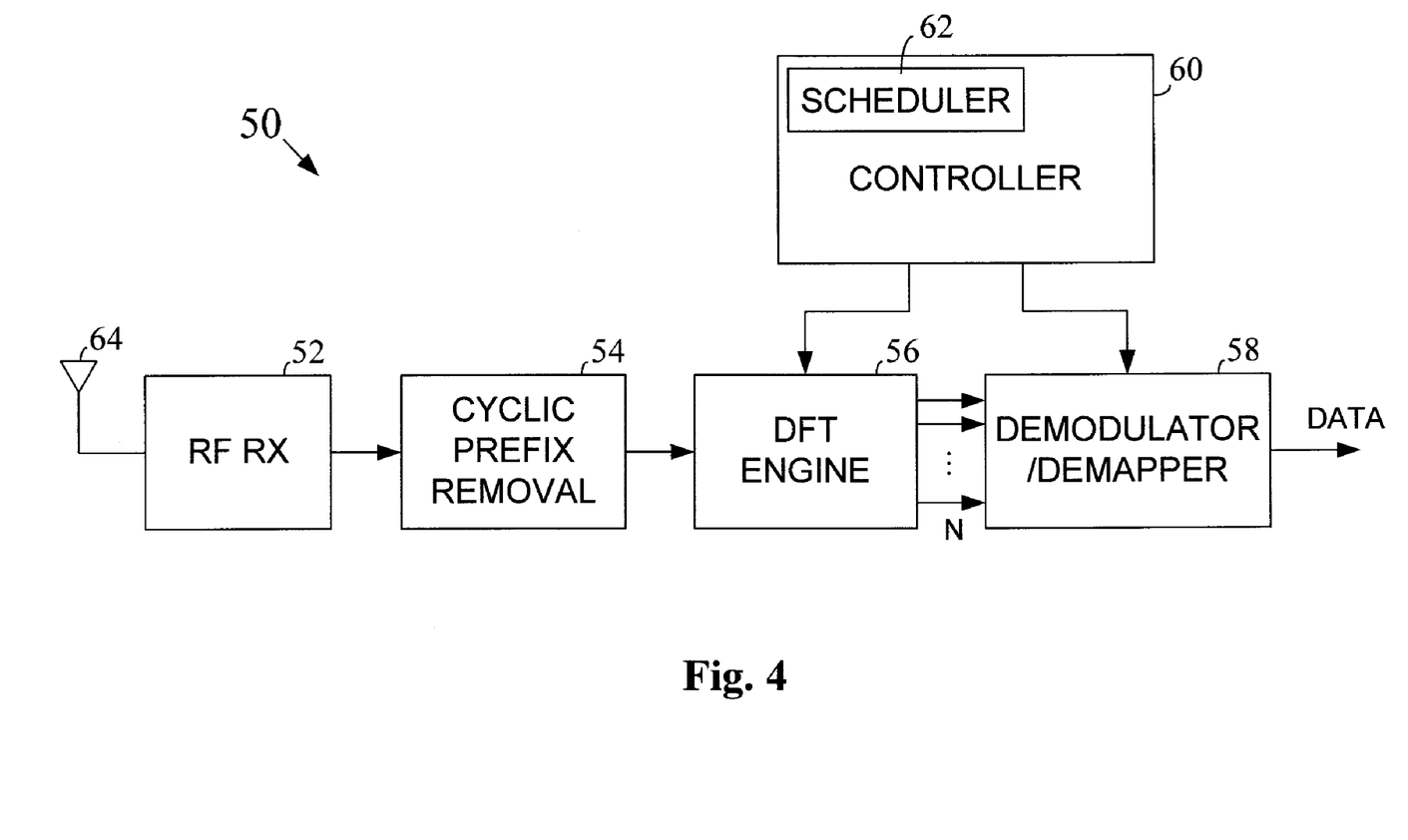
FIG. 4 is a block diagram illustrating an example receiver chain in accordance with an embodiment of the present invention.

FIG. 4 is a block diagram illustrating an example receiver chain 50 in accordance with an embodiment of the present invention. The receiver chain 50 may be used within, for example, the same communication device as the transmitter chain 20 of FIG. 2. As illustrated, the receiver chain 50 may include one or more of: an RF receiver 52, cyclic prefix removal logic 54, a discrete Fourier transform (DFT) engine 56, a demodulator/demapper 58, and a controller 60 that includes scheduler logic 62. If the receiver chain 50 is within the same communication device as the transmitter chain 20 of FIG. 2, then the same controller and scheduler logic may be used for both. The RF receiver 52 is operative for receiving OFDM symbols from a wireless medium. As described previously, each OFDM symbol received by the RF receiver 52 may include modulated subcarriers from multiple different SSs within the cell. The RF receiver 52 may be coupled to one or more antennas 64 to facilitate reception. Any type of antenna(s) may be used including, for example, a dipole, a patch, a helical antenna, an antenna array, and/or others. In at least one embodiment, the RF receiver 52 of FIG. 4 and the RF transmitter 28 of FIG. 2 are within the same device and share at least one antenna.

When the RF receiver 52 receives an OFDM symbol from the wireless medium, it may downconvert the signal to a baseband representation. The signal may then be digitized before being output to the cyclic prefix removal logic 54. The cyclic prefix removal logic 54 then removes any cyclic prefix within the received symbol. The resulting signal is then delivered to the DFT engine 56 which performs a DFT operation on the signal that converts the signal from a time domain representation to a frequency domain representation. The frequency domain samples that are output by the DFT engine 56 correspond to the subcarriers of the OFDMA system. The frequency domain samples may then be delivered to the demodulator/demapper 58 which demodulates the symbols associated with each subcarrier and demaps the resulting data. The data may then be directed to, for example, a demultiplexer (not shown) to be separated based on user or destination.

As before, the scheduler logic 62 may be configured to vary the number of subcarriers being used in the cell based on some criterion (e.g., traffic load levels within the cell, etc.). If the value of N changes, the controller 60 may then cause the DFT engine 56 and/or the demodulator/demapper 58 to be reconfigured to operate with the new number of subcarriers. The DFT engine 56 may be reconfigured in a similar manner to the IDFT engine 24 of FIG. 2 discussed previously.

When the scheduler logic 32, 62 determines that current traffic load is high in the cell, it may decide to increase the number of subcarriers N being used within the cell to better accommodate the high traffic load. With reference to FIG. 3, in one possible approach, additional subcarriers may be added in a direction 46. When the new subcarriers are added, the MAP data within the control subcarrier(s) 42 should reflect the new subcarrier profile so that the SSs will be able to adapt to the new arrangement. In at least one embodiment, there will be a core set of subcarriers that will always be used and a corresponding minimum DFT, IDFT size. The control subcarrier(s) 42 should be within this core set of subcarriers. When subcarriers are added to the system by the scheduler logic 32, 62, additional control information may be added to the pre-existing control subcarrier(s) 42 to describe the added subcarriers or new control subcarriers may be defined within the added subcarriers to include the control information for the added subcarriers. In at least one embodiment, one or more new control subcarriers are defined when the total number of subcarriers is increased above a first quantity. Further control subcarriers may then be defined when the total number of subcarriers is increased above a second quantity, and so on. As described previously, redundant control subcarriers may also be provided.

In at least one embodiment, operation may be initiated within a network cell using a core set of subcarriers. When the traffic load within the cell transitions past a particular level, the scheduler logic 32, 62 may determine that more subcarriers need to be added. A predetermined number may then be added and the controller may reconfigure the appropriate components within the transceiver. If the traffic load then transitions past a second level, additional subcarriers may be added, and so on. In one approach, subcarriers may be added whenever the channel load exceeds a fixed percentage of the maximum possible load. Thus, when the traffic load first exceeds X % of the maximum load, subcarriers may be added. The new subcarriers then increase the maximum possible load. If the load then transitions past X % of the new maximum load, more subcarriers may be added, and the maximum possible load will increase again, and so on. If the traffic load later decreases, then the number of subcarriers being used may be reduced. This may be done in a manner similar to the increases described above. In at least embodiment, only two different subcarrier quantities are used within a cell and the cell may toggle back and forth between the two values. In other embodiments, larger numbers of different subcarrier quantities are used.

In general, an increase in the number of subcarriers that are used within a cell will increase the bandwidth being used within the region. However, in some scenarios, the bandwidth required to support an increase in the number of subcarriers may not be available. For example, if a neighboring cell is using the subcarriers that are to be added to the cell of interest, then interference may be generated by adding the additional subcarriers to the cell of interest. Also, federal communications commission (FCC) licensing may also present an issue. In many cases, an FCC (i.e. regulatory body) license must be acquired before transmissions are made within certain regions of the electromagnetic spectrum. In at least one embodiment of the invention, before an increase is made in the number of subcarriers being used within a network cell, a check is made to determine whether a license has been obtained for the bandwidth that will be occupied by the new subcarriers (if a license is required). Such a check may be performed, for example, each time an increase in the number of subcarriers is to be made. The check may be as simple as checking a data file stored within the communication device that indicates the portions of the spectrum for which licenses are currently in effect. Other more complex license check procedures may alternatively be used.

In some embodiments of the invention, many different types of subscriber devices will be able to communicate with a BS in a cell at the same time. These device types may have different characteristics and different capabilities from one another. For example, some devices may only be capable of operating within a relatively narrow bandwidth, while others may be capable of operating over wider bandwidths. Some devices may be power limited, while other devices are capable of relatively high transmit power levels. Some devices may only be capable of operation using certain subcarriers, while others can use a much wider range of subcarriers. In at least one embodiment of the present invention, the scheduler functionality within the BS is able to collect information regarding the capabilities of the various subscriber stations within the its cell and use this information to determine how to assign bandwidth to the subscribers. Thus, if an older device is active within the cell that is only operative within a core set of subcarriers, then this older device will be allocated subcarriers from the core set and not from the subcarriers added later. Newer subscriber devices, on the other hand, may be assigned subcarriers within the expanded bandwidth region. Of course, other factors may also be taken into consideration when scheduling including, for example, channel conditions between a particular device and a BS. For example, if there is significant fading for a subcarrier in a channel between a subscriber unit and a BS, then that subcarrier may be allocated to a different device within the cell that has better channel characteristics for that subcarrier. Quality of service (QOS) commitments and other priorities may also be considered in making the subcarrier assignments during scheduling.

Figure 5:
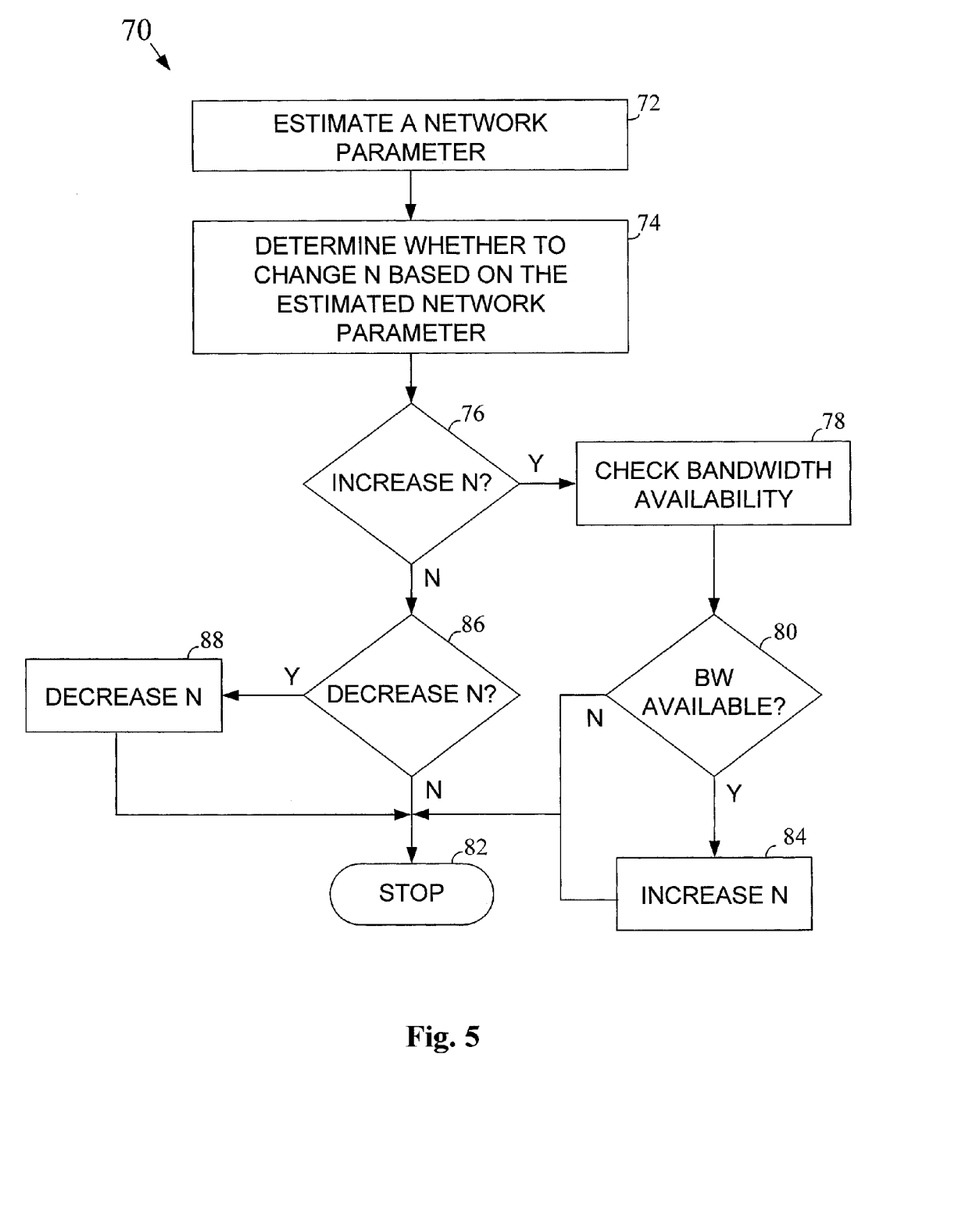
FIG. 5 is a flowchart illustrating an example method for use in supporting scalability within a network in accordance with an embodiment of the present invention.

FIG. 5 is a flowchart illustrating an example method 70 for use in supporting scalability within a communication network in accordance with an embodiment of the present invention. The method 70 may be implemented within the controllers 30, 60 of FIGS. 2 and 4, respectively, and/or within other device controllers. As illustrated, a network parameter may first be estimated within a network (block 72). The estimated network parameter is then used to determine whether to change the number of subcarriers N being used by a multicarrier device to communicate with other devices (block 74). In at least one embodiment, the network parameter that is estimated includes a traffic load (or load related parameter) within the corresponding network. For example, in a cellular wireless network, the traffic load within a cell of the network may be estimated and used to determine whether to change a number of subcarriers being used by a base station within the cell. In addition to the estimated network parameter, other factors may also be considered when determining whether to change the number of subcarriers.

During the determination of whether to change the number of subcarriers N (block 74), it may be determined whether an increase in the number of subcarriers will be an effective means to increase system capacity in a given instance. For example, an increase in the number of subcarriers being used may not generate much additional capacity if all or most of the SSs within the cell are older devices that cannot operate using the new subcarriers. Thus, in at least one embodiment, device capabilities within the cell may also be considered in determining whether to change the number of subcarriers being used.

If block 74 results in a decision to keep the number of subcarriers at its present value, then the method 70 may immediately terminate (block 82). If block 74 results in a decision to increase the number of subcarriers being used (block 76-Y), it may next be determined whether the requisite bandwidth is "available" to support the increase (block 78). As described previously, bandwidth availability may be checked based on, for example, interference creation, FCC licensing concerns, and/or other factors. If the bandwidth is not available (block 80-N), then the number of subcarriers will not be increased and the method 70 will terminate (block 82). If the bandwidth is available (block 80-Y), then N will be increased (block 84) before the method 70 terminates (block 82). If block 74 results in a decision to decrease the number of subcarriers being used (block 86-Y), then N will be decreased (block 88) before the method terminates (block 82). If any change is made in N during the method 70, the appropriate functions within the communication device may subsequently be reconfigured based on the new value of N. The method 70 may be performed repeatedly (e.g., periodically, continuously, at predetermined times, etc.) during the operation of a corresponding communication device.

It should be appreciated that the transmitter and receiver architectures of FIGS. 2 and 4, respectively, are merely illustrative of example architectures that may implement features of the invention. Many other architectures may alternatively be used. In addition, in the description above, the inventive techniques are discussed in the context of an OFDMA-based system. It should be appreciated that features of the invention may also be beneficially implemented within traditional OFDM-type systems and systems using other forms of multicarrier communication. In a traditional OFDM system, for example, the size of the OFDM symbol being used by a single SS station may be increased when it is determined that traffic load within a cell is high (or that some other criterion has been met). By increasing OFDM symbol size, the buffered data for a particular user may be able to be transferred through the channel in fewer OFDM symbols, thus increasing overall system capacity and throughput. If traffic load is lower, then smaller OFDM symbol sizes may be used. Bandwidth availability checks and other considerations described above can also be used in a traditional OFDM system.

In the description above, terminology is used that may be associated with the IEEE 802.16 wireless networking standard. However, it should be appreciated that the inventive techniques and structures are not limited to use with this standard. That is, features of the invention may be implemented in any multicarrier communication system in which scalability is desired. In addition, although described above in the context of a wireless system, it should be understood that applications within wired multicarrier systems also exist. Furthermore, although described in the context of an infrastructure type network, features of the invention may also be beneficially implemented within peer-to-peer and ad-hoc networks. In such a case, controllers within nodes of the network may corporately determine that more bandwidth is needed to accommodate an increase in load (e.g., the start of a large file transfer, streaming video, etc.) and thus increase the number of subcarriers being used within the network. Each node in the link would then have to configure its internal circuitry to operate with the new number of subcarriers (e.g., modify DFT and IDFT engines and other components, etc.). Alternatively, a single master controller may be designated to make subcarrier quantity decisions within the ad-hoc arrangement. As used herein, the term "logic" may include, by way of example, software or hardware and/or combinations of software and hardware.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

It should be appreciated that the individual blocks illustrated in the block diagrams herein may be functional in nature and do not necessarily correspond to discrete hardware elements. For example, in at least one embodiment, two or more of the blocks in a block diagram are implemented in software within a common digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus comprising:
    a Fourier transform engine to perform a discrete Fourier transform (DFT) on orthogonal frequency division multiplexing (OFDM) symbols received from a communication medium or an inverse discrete Fourier transform (IDFT) on modulated subcarriers to generate an OFDM symbol for transmission, the Fourier transform engine having a variable DFT size for the DFT and a variable IDFT size for the IDFT;
    a controller to:
        check a data file for bandwidth availability within a network cell when a determination to increase in the number of subcarriers is made, wherein varying a number of subcarriers (N) being used is based on capability information that includes the data file, which indicates portions of an electromagnetic spectrum for which regulatory body licenses are currently obtained for the network cell,
        determine whether a regulatory body license has been acquired to use spectrum associated with the increased number of subcarriers using the data file, when the regulatory body license is required,
        vary the number of subcarriers (N) being used by the apparatus to communicate with wireless devices by a predetermined number of subcarriers each time a cell traffic load exceeds or falls below a specified percentage of a maximum cell traffic load, and
        change the DFT size or IDFT size of the Fourier transform engine in accordance with the number of subcarriers.

2. The apparatus of claim 1, wherein the controller includes logic to:
    collect capability information about the wireless devices, wherein varying the number of subcarriers (N) being used is based on the capability information for each wireless device that includes device power limitations, device bandwidth width limitations, or which subcarriers a wireless device is capable of using.

3. The apparatus of claim 2, wherein the controller includes logic to use the capability information to allocate subcarriers to the wireless devices.

4. The apparatus of claim 1, wherein the apparatus has a core set of subcarriers that are used to transmit control data while the remaining subcarriers vary in data and control functionality, wherein the core set of subcarriers includes at least one control subcarrier to carry Multiple Access Protocol (MAP) data.

5. The apparatus of claim 4, wherein the controller includes logic to define an additional control subcarrier to carry MAP data when the controller increases the number of subcarriers above a predetermined quantity.

6. The apparatus of claim 1, further comprising:
    a modulation/mapping engine to demodulate symbols associated with subcarriers of received OFDM symbols and to demap resulting data, and to map input data bits to data symbols associated with subcarriers of an OFDM symbol to be generated and to modulate the subcarriers using the data symbols, wherein the controller includes logic to reconfigure the modulation/mapping engine when the number of subcarriers is changed.

7. The apparatus of claim 1, wherein the Fourier transform engine can change the DFT size or the IDFT size to at least three different sizes.

8. A computer implemented method comprising:
    estimating a network parameter;
    determining whether to change a number of subcarriers (N) being used by a multicarrier device by a predetermined number of subcarriers based, at least in part, on the estimated network parameter and capability information, each time a cell traffic load exceeds or falls below a specified percentage of a maximum cell traffic load, wherein the multicarrier device is a wireless base station providing network access services within a cell of a network and the network parameter includes a communication traffic load within the cell;
    checking a data file for bandwidth availability within a network cell when a determination to increase in the number of subcarriers is made, wherein the capability information includes the data file, which indicates portions of an electromagnetic spectrum for which regulatory body licenses are currently obtained for the network cell;
    using the data file, determining whether an regulatory body license has been acquired to use the spectrum associated with increasing the number of subcarriers; and
    increasing the number of subcarriers in electromagnetic spectrum for which regulatory body licenses are obtained.

9. The method of claim 8, further comprising:
    collecting capability information from wireless communication devices communicating with the multicarrier device, wherein the capability information for each wireless communication device includes device power limitations, device bandwidth width limitations, or which subcarriers a wireless communication device is capable of using.

10. The method of claim 8, wherein determining whether to change a number of subcarriers being used includes deciding to increase the number of subcarriers each time an estimated communication traffic load is greater than a predetermined level.

11. The method of claim 8, wherein determining whether to change a number of subcarriers being used includes deciding to decrease the number of subcarriers each time an estimated communication traffic load is less than a predetermined level.

12. The method of claim 8, further comprising:
    changing a discrete Fourier transform (DFT) size or an inverse discrete Fourier transform (IDFT) size of a Fourier transform engine within the multicarrier device when the number of subcarriers is changed.

13. The method of claim 8, further comprising:
    reconfiguring a modulation/mapping engine within the multicarrier device when the number of subcarriers is changed.

14. A system comprising:
a dipole antenna to receive orthogonal frequency division multiplexing (OFDM) symbols from a wireless communication medium;
a Fourier transform engine to perform a discrete Fourier transform (DFT) on OFDM symbols received from by the dipole antenna or an inverse discrete Fourier transform (IDFT) on modulated subcarriers to generate an OFDM symbol for transmission on the dipole antenna, the Fourier transform engine having a variable DFT size for the DFT and a variable IDFT size for the IDFT; and
a controller to:
check a data file for bandwidth availability within a network cell when a determination to increase in the number of subcarriers is made, wherein varying a number of subcarriers (N) being used is based on capability information that includes the data file, which indicates portions of an electromagnetic spectrum for which regulatory body licenses are currently obtained for the network cell,
determine whether a regulatory body license has been acquired to use spectrum associated with the increased number of subcarriers using the data file, when the regulatory body license is required,
vary a number of subcarriers (N) being used by the system to communicate with wireless devices by a predetermined number of subcarriers each time a cell traffic load exceeds or falls below a specified percentage of a maximum cell traffic load, and
change the DFT size or IDFT size of the Fourier transform engine in accordance with the number of subcarriers.

15. The system of claim 14, wherein the controller includes logic to:
collect capability information about the wireless devices, wherein varying the number of subcarriers (N) being used is based on the capability information for each wireless device that includes device power limitations, device bandwidth width limitations, or which subcarriers a wireless device is capable of using.

16. The system of claim 14, wherein the Fourier transform engine can change the DFT size or the IDFT size to at least three different sizes.

17. An article comprising a non-transitory computer readable storage medium having instructions stored thereon that, when executed by a computing platform, operate to:
estimate a network parameter for a multicarrier wireless network including a base station and a plurality of user devices;
determine whether to change a number of subcarriers (N) being used by the base station to communicate with the user devices by a predetermined number of subcarriers based, at least in part, on the estimated network parameter and capability information, each time a cell traffic load exceeds or falls below a specified percentage of a maximum cell traffic load;
check a data file for bandwidth availability within a network cell when a determination to increase in the number of subcarriers is made, wherein the capability information includes the data file, which indicates portions of an electromagnetic spectrum for which regulatory body licenses are currently obtained for the network cell;
using the data file, determining whether an regulatory body license has been acquired to use the spectrum associated with increasing the number of subcarriers; and
increasing the number of subcarriers in electromagnetic spectrum for which regulatory body licenses are obtained.

18. The article of claim 17, wherein the instructions further operate to:
collect capability information for user devices communicating with the base station, wherein the capability information for each user device includes device power limitations, device bandwidth width limitations, or which subcarriers a user device is capable of using.

19. The article of claim 17, wherein the instructions further operate to:
change a discrete Fourier transform (DFT) size or an inverse discrete Fourier transform (IDFT) size of an Fourier transform engine within the base station when the number of subcarriers is changed.

* * * * *